United States Patent

Wagner

[15] 3,699,793
[45] Oct. 24, 1972

[54] APPARATUS FOR FORMING ROLLER BEARING CAGES

[72] Inventor: William S. Wagner, 4945 Navarre Road, S. W., Canton, Ohio 44706

[22] Filed: Oct. 19, 1970

[21] Appl. No.: 81,840

[52] U.S. Cl. ................... 72/134, 72/135, 29/148.4 C
[51] Int. Cl. ........................ B21c 47/00, B21d 53/12
[58] Field of Search ........ 72/130, 136, 135, 139, 137, 72/167, 127, 134; 29/148.4 C; 113/117

[56] References Cited

UNITED STATES PATENTS

| | | | |
|---|---|---|---|
| 3,085,529 | 4/1963 | Admerand | 72/49 |
| 1,042,552 | 10/1912 | Harter | 72/130 |
| 3,568,728 | 3/1971 | Muller | 72/135 |
| 3,526,026 | 9/1970 | Warchol | 29/148.4 C |

Primary Examiner—Charles W. Lanham
Assistant Examiner—R. M. Rogers
Attorney—Frease & Bishop

[57] ABSTRACT

Apparatus for forming roller bearing cages from an elongated strip of metal of uniform thickness by passing the strip between a hollow roll mounted in fixed bearings and an adjustably mounted pinch roll located therethrough. At least one of the rolls is power driven. The pinch roll is adjustable longitudinally, laterally and angularly relative to the fixed roll to compensate for variations in thickness of the metal strip and to form a laterally tapered cross-section in the metal strip. The metal strip is guided through an adjustably mounted stock guide to the rolls which taper the strip laterally and bend it into a spiral coil. One at a time, the endmost complete convolution is cut from the spirally coiled metal strip, the ends thereof are brought into alignment with each other and welded. Slots for the bearing rollers may be cut out of the cage at this time, or may be cut out of the metal strip before it is passed through the apparatus. In a modified form of the apparatus, the metal strip is furnished in lengths suitable for forming a single cage instead of being formed into a spiral coil and then cut apart to form a plurality of cages.

3 Claims, 5 Drawing Figures

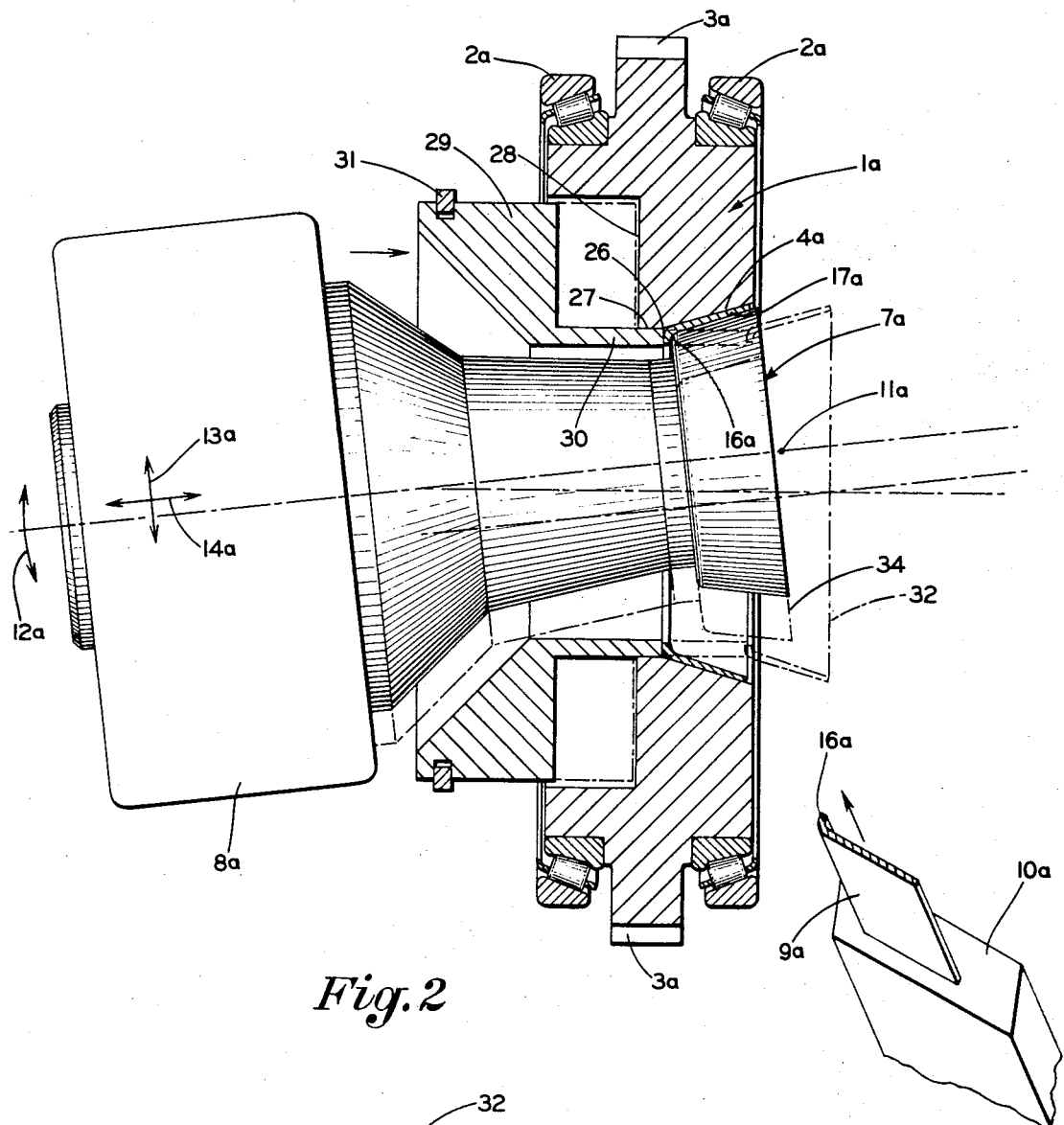
Fig. 2
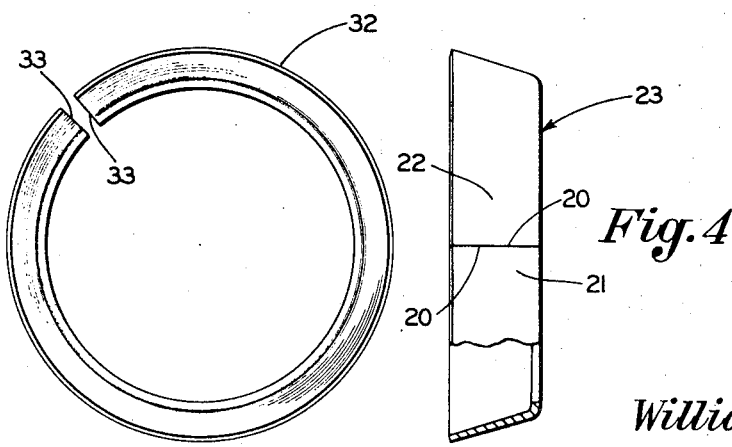
Fig. 3
Fig. 4
INVENTOR.
William S. Wagner
BY
Frease & Bishop
ATTORNEY

APPARATUS FOR FORMING ROLLER BEARING CAGES

CROSS-REFERENCE TO RELATED APPLICATION

This invention is a further development of the apparatus disclosed in my copending application Ser. No. 47,305, filed on June 18, 1970, for Apparatus and Method for Forming Roller Bearing Cages.

BACKGROUND OF THE INVENTION

1. Field of the Invention

The invention relates to means for forming cages for tapered roller bearings, especially large bearings for industrial use, from a metal strip of proper cross-section as it is received from conventional forming rolls.

2. Description of the Prior Art

To the best of applicant's knowledge, the common method for forming such tapered roller bearing cages from sheet metal, except applicant's prior application above referred to, is to cut a disc of proper dimensions from a square sheet of metal and then press this sheet metal blank into truncated conical shape and punch out the center leaving a flanged conical ring. This necessitates the waste of a great portion of the square metal sheet, since the four corners are cut away and the entire central portion of the sheet is also cut away.

SUMMARY OF THE INVENTION

The invention comprises apparatus for receiving a flanged metal strip from conventional forming rolls, cross-sectionally forming the strip and bending it into spiral shape, single convolutions being cut from said spiral coil, one at a time, and the ends thereof pulled together and welded to form a tapered cage. The usual slots for accommodating single bearing rolls may be cut from the formed cage or may be stamped from the metal strip before it is formed.

The apparatus for forming roller bearing cages from a metal strip comprises a hollow roll mounted in fixed bearings and an adjustably mounted pinch roll located therethrough for receiving therebetween a flanged strip of metal from conventional forming rolls. The fixed roll may be provided with gear teeth for operatively connecting the same with a driving motor, through suitable reduction gearing.

The pinch roll is adjustable longitudinally laterally and angularly with relation to the fixed roll. The angular adjustment provides for rolling the unflanged edge of the metal strip thinner forming a tapered cross-sectional shape. The longitudinal and lateral adjustment of the pinch roll toward and from the fixed roll compensates for variations in thickness of the metal strip.

It, therefore, is an object of the invention to provide an apparatus for forming roller bearing cages from a metal strip, said apparatus including a hollow roll journalled in fixed bearings and a pinch roll adjustably located therethrough with means for thinning one edge of the strip and bending it into one or more convolutions each suitable for forming a roller bearing cage, at least one of said rolls being power driven.

Another object of the invention is to provide such an apparatus in which the hollow roll has a tapered opening therein and the pinch roll has a tapered portion cooperating with said tapered opening.

These and other objects, apparent from the drawings and following description, may be attained, the above described difficulties overcome and the advantages and results obtained, by the apparatus, construction, arrangements, and combinations, subcombinations and parts which comprise the present invention, a preferred embodiment of which, illustrative of the best mode in which applicant has contemplated applying the principle, being set forth in detail in the following description and illustrated in the accompanying drawings.

BRIEF DESCRIPTION OF THE DRAWINGS

FIG. 2 is a view similar to FIG. 1 of a modified form of the invention;

FIG. 3 is an elevation of the partially completed product of the apparatus of FIG. 2;

FIG. 4 is a side elevation of a formed cage; and

Similar numerals refer to similar parts throughout the drawings.

DESCRIPTION OF THE PREFERRED EMBODIMENTS

Figure 1:
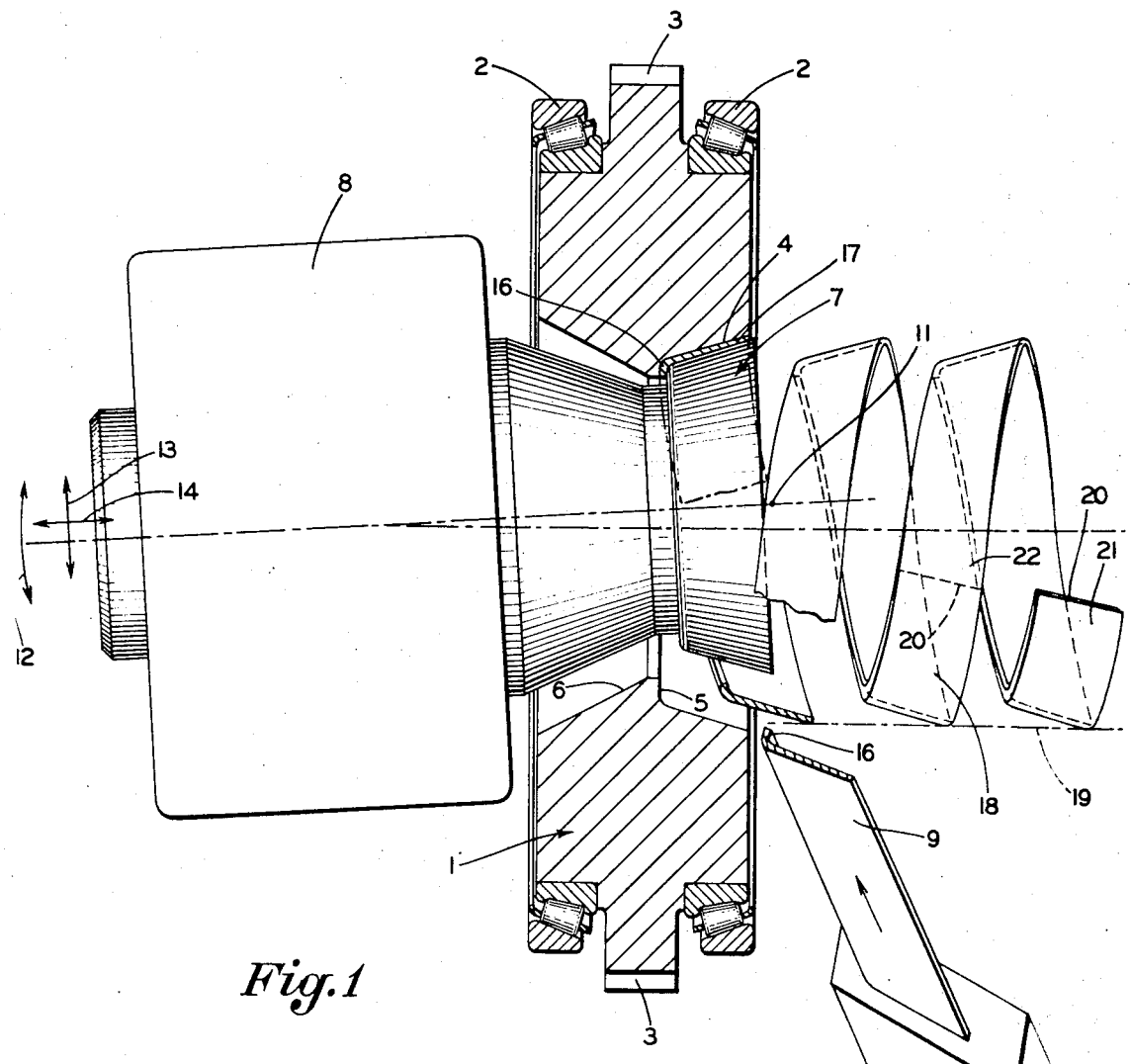
FIG. 1 is a side elevation, with parts in section, of apparatus embodying the invention.

Referring first to the embodiment of the invention shown in FIG. 1, a hollow roll is indicated at 1, journalled in suitable bearings such as the roller bearings 2 which are fixedly mounted in a suitable support (not shown). The hollow roll 1 may be power driven in any suitable manner such as through the gear teeth 3 formed around the periphery thereof.

The hollow roll 1 may be referred to as a fixed roll as it is rotatable in bearings, fixed in the support. This hollow roll has a concentric, internal, conical opening tapered inwardly from one side, as indicated at 4, to the shoulder 5, and then preferably flared outward to the other side, as shown at 6.

An inner or pinch roll is indicated generally at 7 and is journalled in a housing 8. This inner roll cooperates with the inwardly tapered conical opening 4 in the fixed roll 1 and is adjustably mounted relative thereto.

The inner roll may be driven by any conventional means or may be an idler. The two rolls 1 and 7 are adapted to receive between them a long narrow metal strip 9 from a conventional stand of forming rolls. A stock guide 10 is provided for guiding the metal strip 9 between the rolls 1 and 7.

The housing 8 of the inner roll 7 is adjustably mounted upon the above mentioned support in any conventional manner so that it is adjustable about a pivot point 11 (FIG. 1) in the direction of the double arrow 12 to adjust the taper formed on the metal strip 9 by the rolls. The housing 8 is also adjustable to adjust the inner roll 7 toward and from the fixed roll 1 both vertically and horizontally as indicated by the double headed arrows 13 and 14, respectively.

The stock guide 10 is adjustable in all directions to compensate for adjustment of the inner roll, and to determine the lead of the helix.

The metal strip 9 has a flange or bead 16 formed at one edge in the conventional forming rolls. When the metal strip is fed between the rolls 1 and 7, as shown in FIG. 1, this flange 16 is received against the shoulder 5 of the roll 1. The inner roll 7 should be so adjusted relative to the fixed roll 1 that the metal strip 9 is tapered toward the edge opposite to the flange 16 as indicated in section at 17 in FIG. 1.

As the metal strip 9 passes between the rolls 1 and 7, it is bent into a substantially cylindrical helical coil, as indicated at 18. As indicated by the broken line 19 any suitable support may be provided for supporting the helical coil 18 as it is formed.

One complete convolution at a time is cut from the outer end of the spiral coil 18 along a diagonal line 20. The upwardly and downwardly disposed ends 21 and 22, respectively, of the cutoff convolution are then pulled toward each other, the edges 20 being welded together as shown in FIG. 4 forming a complete tapered roller bearing cage indicated generally at 23.

Figure 5:
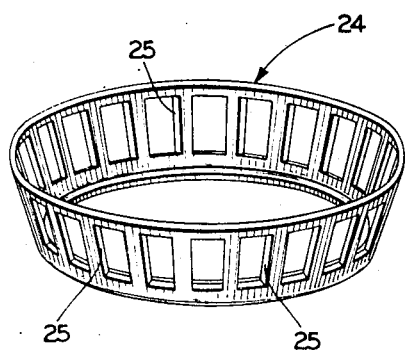
FIG. 5 is a perspective view of a formed and slotted cage.

The finished cage is indicated generally at 24 in FIG. 5, having the slots 25 therein for the individual bearing rolls. These slots may be stamped into the cage after it is in the form shown in FIG. 4, or may be stamped in the stock strip 9 between the conventional forming rolls and the present apparatus.

In FIG. 2 is shown a modification of the invention comprising the hollow fixed roll indicated generally at 1a and the inner or pinch roll indicated generally at 7a.

The roll 1a is journalled in suitable bearings such as the roller bearings 2a mounted in a support (not shown). Gear teeth 3a may be formed around the periphery of the roll 1a for applying power for rotating the roll.

The roll 1a has an internal conical surface tapered inwardly as indicated at 4a (FIG. 2) to a point 26 and then extending axially of the roll for a short distance as at 27 to the cutout portion 28.

A discharge ring 29 is axially movably mounted within the cutout portion 28 and provided with the reduced extension 30 slidable within the axial opening 27. The discharge ring is adapted to be operated by conventional means such as a shifting shoe or fork indicated at 31.

The inner roll 7a is journalled in a housing 8a which is adjustable about a pivot point 11a in the direction of the double headed arrow 12a to provide for the desired taper in the metal strip. The housing 8a is also adjustable toward and from the roll 1a in the direction of the double headed arrow 13a and 14a to compensate for variations in thickness of the metal strip.

In this form of the invention, the metal strip 9a is the same as the metal strip 9 above described and provided at one edge with a flange 16a, except that instead of indefinite length to form a spiral coil as in FIG. 1, the strip 9a is of a length suitable to form only one single convolution indicated in broken lines at 32 in FIG. 2.

Each metal strip 9a is fed to the pinch of the rolls 1a and 7a by a stock guide 10a. The flange 16a of the strip is received against the end of the extension 30 of the discharge ring as shown in FIG. 2.

The rolls 1a and 7a roll the strip into a taper toward the edge opposite the flange 16a as illustrated in section at 17a (FIG. 2). When each convolution has been formed the housing 8a and roll 7a are moved to position 34 and the shifting shoe or fork 31 is operated to move the discharge ring to the broken line position of FIG. 2 to discharge the convolution 32 therefrom.

In FIG. 3 is shown an elevation of such a convolution 32. The ends 33 are drawn together and welded forming a complete cage as indicated in FIG. 4. After slots for individual bearing rolls are stamped on the same, this cage will be the same as shown in FIG. 5.

Although the invention is disclosed primarily for forming cages for roller bearings, it could be used for forming any frusto-conical member such as shown in FIG. 4 or even a spiral coil as indicated at 18 in FIG. 1.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of the preferred embodiments thereof, and the advantageous, new and useful results obtained thereby; the new and useful construction, and reasonable mechanical equivalents thereof obvious to those skilled in the art, are set forth in the disclosure.

I claim:

1. Apparatus for forming sheet metal cages for tapered roller bearings and the like from a metal strip having a length suitable for forming one cage, the apparatus comprising a hollow roll, an inner roll adjustably mounted within the hollow roll, at least one of said rolls being power driven, said rolls being adapted to receive therebetween the metal strip to bend it into a single convolution, and a discharge ring axially movable within the hollow roll for discharging the formed convolution therefrom.

2. Apparatus as defined in claim 1 in which the edge of the discharge ring forms a stop for the metal strip.

3. Apparatus for forming sheet metal cages for tapered roller bearings and the like from a metal strip, said apparatus comprising a hollow roll, an inner roll adjustably mounted within the hollow roll, at least one of said rolls being power-driven, said hollow roll having an internal conical surface and the inner roll having a similar conical outer surface cooperating therewith, said rolls being adapted to receive therebetween the metal strip and to bend it into at least one convolution, and an annular shoulder at the inner end of the conical surface of the hollow roll forming a stop for the metal strip.

* * * * *